June 12, 1934.                A. H. NEUREUTHER                1,962,832
SELF STARTING SYNCHRONOUS SINGLE PHASE ALTERNATING CURRENT MOTOR
                    Filed June 23, 1930      2 Sheets-Sheet 1

INVENTOR.
Andrew H. Neureuther

June 12, 1934.  A. H. NEUREUTHER  1,962,832
SELF STARTING SYNCHRONOUS SINGLE PHASE ALTERNATING CURRENT MOTOR
Filed June 23, 1930   2 Sheets-Sheet 2

INVENTOR.
Andrew H. Neureuther

Patented June 12, 1934

1,962,832

UNITED STATES PATENT OFFICE 1,962,832

SELF STARTING SYNCHRONOUS SINGLE PHASE ALTERNATING CURRENT MOTOR

Andrew H. Neureuther, Peru, Ill., assignor to Western Clock Company, Peru, Ill., a corporation of Illinois Application June 23, 1930, Serial No. 463,145

22 Claims. (Cl. 172—275)

My invention relates to self starting synchronous alternating current motors and has for its object the production of such a motor wherein the motor rotor is self started as an induction motor and when it is started as such an independent synchronizing member is automatically moved into the magnetic path of the rotating field and brought sufficiently adjacent to a coacting means associated with the rotor to influence the rotor to run in synchronism with the alternations of the alternating electric current.

A further object is to produce such a motor that is extremely simple in construction and absolutely positive first in its self starting action and finally in its synchronous rotation and one that is very inexpensive to produce.

I attain these objects by the means shown in the accompanying drawings in which, Fig. 1 shows a partial cross sectional view of one of the simplest forms of my motor along a line 1—1 of Figure 2 showing the synchronizing element away from the rotor.

Similar numerals represent the same parts throughout the several views.

Figure 1:
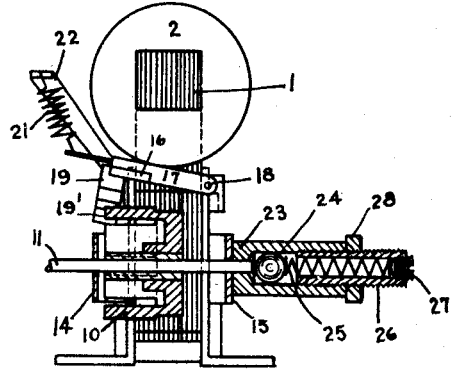
Figure 2:
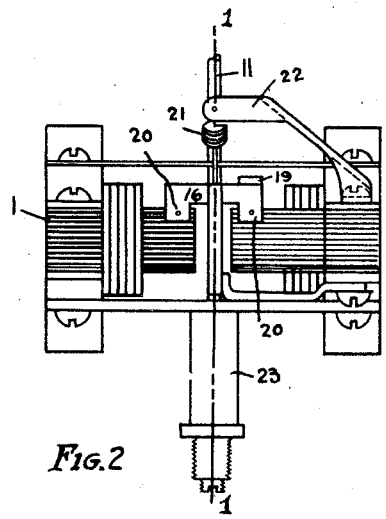
Fig. 2 shows a top view of same.

In the drawings 1 represents the usual laminated magnetic frame of a single phase synchronous induction motor having the field winding 2 through which the alternating current from the commercial light or power line passes. 3—4—5 and 6 represent the pole pieces on the motor frame 2 the poles 4 and 6 having the shading coils 7 and 8 respectively mounted thereon. Within the pole pieces 3—4—5 and 6 is the rotor space 9 in which the rotor 10, which is mounted on the shaft 11, rotates.

It is evident that when a single phase alternating current is passed through the field coil winding 2 that because the shading coils above mentioned and the arrangement of the other pole pieces, that a rotating magnetic field will be set up in rotor space 9 adjacent to said pole pieces so that a properly arranged rotor will be induced to rotate and thus form a self starting induction motor.

The rotor 10 is cup shaped as shown. The edge of the cup being serrated in having a number of slots 12 and corresponding number of projections 13 formed in said edge as shown in Figures 5—6—13—14 and 15.

Figure 3:
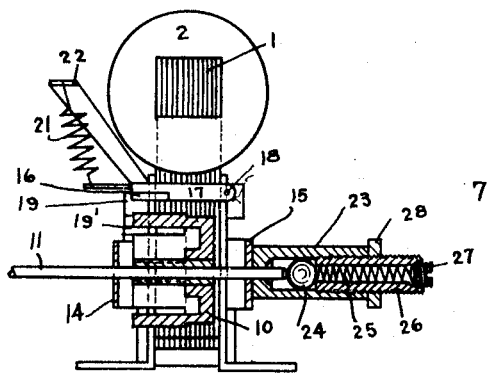
Fig. 3 is a similar partial cross sectional view along a line 1—1 of Figure 2 which shows the position of the synchronizing means adjacent to the rotor in the position in which it causes the rotor to run in synchronous rotation.
Figure 4:
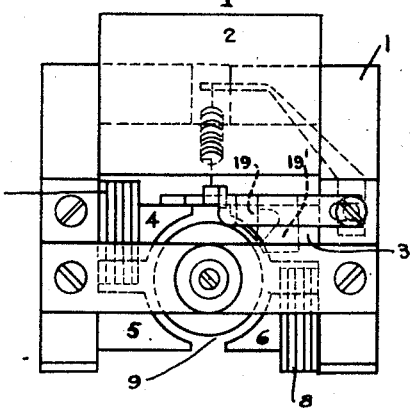
Fig. 4 is a side view of Figure 3.
Figure 5:
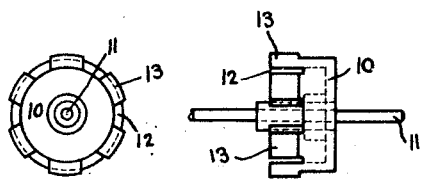
Fig. 5 is an end view of the rotor.
Figure 6:
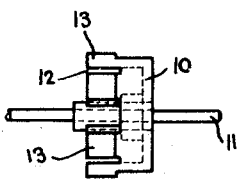
Fig. 6 is a side view of the rotor shown in Figure 5.
Figure 13:
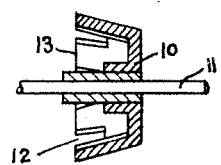
Fig. 13 is a cross sectional view of another embodiment of a rotor for my synchronous motor.
Figure 15:
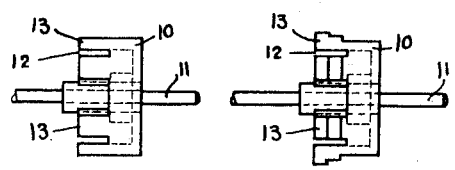
Fig. 15 is a side view of another embodiment showing an extremely simple rotor.
Figure 14:
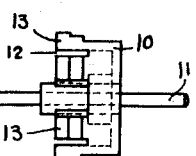
Fig. 14 is a side view of another embodiment showing a rotor having stepped edges.

The shaft 11 is mounted in the bearings 14 and 15. The cup shaped rotor 10 is preferably made of steel treated so its bottom and partial side part adjacent to said bottom part has a large amount of remanence and the outer end of the serrated edges has a correspondingly little remanence. Said cup shaped rotor part is made of sufficient length so that when the part adjacent to the bottom of the cup is in the strongest part of the magnetic field the serrated edges will project beyond the pole pieces as shown in Figure 3. In my invention in conjunction with said rotor I employ a synchronizing means comprising a member 16 preferably made of soft iron which has an arm 17 which is pivotally mounted to the frame 1 at 18 as shown. The said member 16 has a downwardly projecting part 19 and an inwardly projecting part indicated by 19¹ adjacent to the pole 3 and the serrated edges of the rotor and a rearwardly projecting part 20 by means of which it is held in position on pole pieces 3 and 4 and when no current is passing through the field winding 2 said member 16 is held away from said pole pieces 4 and 3 by means of the spring 21 one end of which is fastened to said member 16 and the other end of which is fastened to a part 22 fastened on the motor frame 1 all as shown in Figure 3. When the alternating current is passed through the field coil 2, it is evident that the pole pieces 3 and 4 will pull the member 16 so that its rearwardly projecting part 20, will contact with the pole piece 3 thus bringing its downwardly projecting parts 19 and the inwardly projecting part 19¹ very close to the serrated projections 13 on the rotor as shown in Figure 3. When the member 16 is in this position it is evident that the rotor 10 will run at a definite speed, depending on the number of slots 12 and projections 13 on said rotor, and run in synchronism with the alternations of the alternating current in the field winding 2. The synchronizing member 16 may be so shaped and formed of such suitable material that it may also act as a partial magnetic shunt for the field poles 3 and 4 in addition to its having a plurality of projecting parts 19 and 19¹ each projection of which or which projections together comprise a salient pole piece. It may comprise one independent projecting part alone or a part having a plurality of projections similar to 19 and 19¹ each part in itself which as above mentioned comprises a salient pole piece. It is evident that one or more of said synchronizing members comprising such salient pole pieces having one or a plurality of projecting parts may be movably mounted and controlled adjacent to the field poles of a synchronous motor and be distributed around its rotor to influence the rotor to rotate at the proper synchronous speed of rotation. Attached to and forming a part of bearing 15 is a tubular member 23 into whose central part the right end of shaft 11 projects as shown. The end of shaft 11 is pointed or ball shaped as shown which end rests against the ball 24 which ball is free to move in said tubular part and said ball is held against said shaft by means of the spring 25 which is free to move in a second tubular member 26 which has external threads by means of which it can be positioned in the tubular member 23 and internal threads in its right hand end in which is mounted a threaded bolt 27 which in connection with member 26 serves as a means for adjusting the tension on said spring 25. The member 26, it is evident, serves also to limit the sidewise motion of the shaft 11 between its left hand end and the adjacent conical end in tubular member 23. The member 26 when said limiting space gives the proper sidewise motion to shaft 11, is locked in position by means of nut 28 as shown.

It is evident that the rotor will be held in position at the extreme left when there is no current flowing in the field winding 2 as the spring 25 needs to have sufficient tension only to overcome the sliding friction of the shaft 11 in the bearings 14 and 15. This will be the maximum tension required, but in practice when the current is shut off the rotor 10 due to its acquired momentum keeps on rotating so that the shaft 11 has a rotating motion which reduces the sliding friction considerably so that only a very small amount of tension is required by said spring 25 to hold the said rotor at its extreme left position when no current is flowing in the field winding 2. If the current is permitted to flow in the field winding 2 when the rotor 10 is in its extreme left position the magnetic field set up in the field space 9 acts like a solenoid and sucks or draws the rotor sidewise into the space 9 toward the position of maximum intensity of the field overcoming the tension of the spring 25 pushing the ball 24 until said ball rests against the end of the tubular member 26 before said rotor reaches the position of maximum intensity in the magnetic field set up. It is evident, from the construction of the rotor and its position in the rotating magnetic field produced by the arrangement of the shading coils described, that the rotor will instantly start as an induction rotor at a high speed of rotation at the same time as it is drawn into the magnetic field as just described. At practically the same instant, but somewhat delayed due to its inertia, the synchronizing element 16, is drawn downwardly by the magnetic field to the pole pieces 3 and 4 so that the projecting members 19 and 19¹ are positioned adjacent to the projections 13 and slots 12 on the rotor 10 causing the rotor 10 to run synchronously with the alternations of the alternating current. In the embodiment of my invention shown in Figures 7 and 8 the lever 17 has a projection 29 having a slot 30 which with the flanged collar 31 mounted on the shaft 11, forms a "lost motion" connection so that when the rotor 10 is pulled into the magnetic field as above mentioned, the rotor can move for a considerable distance before it causes the synchronizing member to start on its movement adjacent to said rotor and thus give the rotor a longer period under the influence of the rotating magnetic field whereby its speed of rotation can be increased before the synchronizing element is brought into action. It is evident that with this arrangement the spring 21 can have considerably more tension and thus can be given more delay action in bringing in the synchronizing element and thus bring the self starting action on the rotor up to a maximum thus insuring a positive self starting of the rotor.

Figure 7:
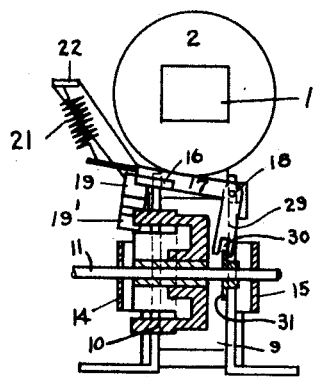
Fig. 7 is a similar cross sectional view of another embodiment of my invention showing the synchronizing means away from the rotor.
Figure 8:
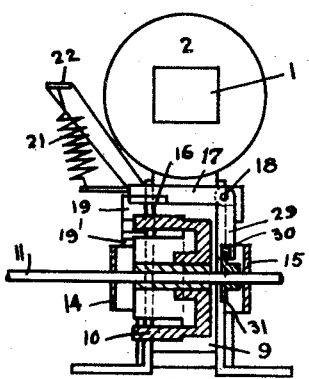
Fig. 8 is a similar cross sectional view of Figure 7 showing the synchronizing means in position to influence the rotor.
Figure 9:
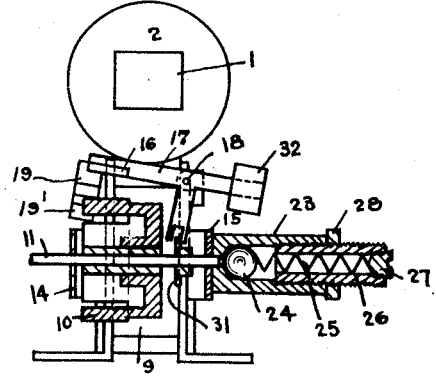
Fig. 9 is a similar cross sectional view of an embodiment of a modification showing synchronizing means away from the rotor.
Figure 10:
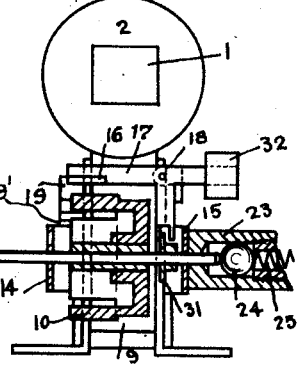
Fig. 10 is a similar cross sectional view as Figure 9 showing the synchronizing means in the position in which it influences the rotor to run in synchronism.

In the embodiment shown in Figures 9 and 10 the same lost motion connection used in Figures 7 and 8 is utilized and the ball 24 and the spring 25 is used and the spring 21 is omitted. A counterbalancing weight 32 is mounted on an extension of the part 17 so that the said synchronizing element will remain in any position in which it may be placed and any large resistance against moving it will be due to the inertia of its mass.

Figure 11:
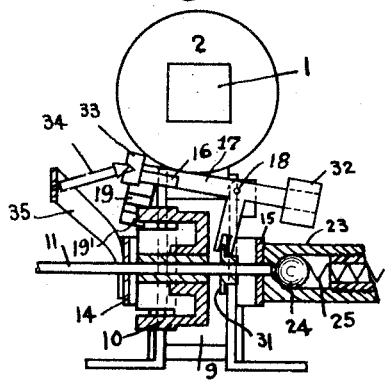
Fig. 11 is a similar cross sectional view of an embodiment of a modification showing the synchronizing means substantially held away from the rotor.
Figure 12:
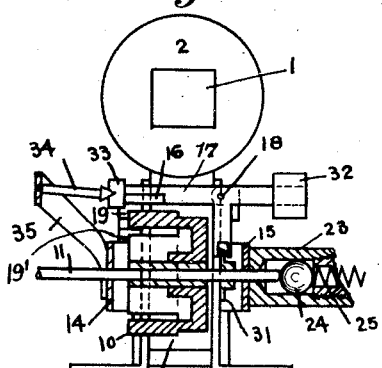
Fig. 12 is a similar cross sectional view to that of Figure 11 showing the synchronizing means substantially held in position in which it influences the rotor to run at synchronous speed.

In the embodiment shown in Figures 11 and 12 the supporting member 17 of synchronizing element 16 has a notch 33 in which rests one end of a strut 34 whose other end rests in a notch in one end of a flat spring a resilient member 35 the other end of which spring is fastened to the frame of the motor as shown. The strut 34 is so located in relation to the spring member 35 and the notch 33 is such that when the said notch 33 is below the line connecting the notch in spring 35 to the center of the part on member 17 the spring 35 will push and hold the synchronizing element adjacent to the rotor as shown in Figure 12 and when said notch 33 is above said line it will hold the synchronizing element away from said rotor as shown in Figure 11 the sidewise motion of the rotor shaft 11 with its flanged member 31 serving to shift the notch 33 in the end of member 17, beyond mentioned line of centers. It is evident with the arrangement just described, and the associated lost motion connection means between the rotor shaft and the synchronizing element that the final bringing the synchronizing element into action can be appreciably delayed so that the rotor will always start under the action of the rotating field as previously above mentioned.

It is evident from the above description that

I have produced a synchronous motor that is self starting and one that is extremely simple and inexpensive to produce and positive in operation. It will be understood of course, that while I have here shown a few forms of my invention I do not wish to limit myself to the exact constructions shown but desire to have them taken in a sense illustrative of any and all the forms that come fairly within the scope of my appended claims.

1. In a self starting synchronous motor, means for producing a rotating magnetic field and a cup shaped rotor formed of magnetizable material having a serrated edge fastened on a shaft rotatably mounted in said magnetic field, each unit of said serrated edge lying substantially in the surface of a truncated cone.

2. In a self starting synchronous motor, means for producing a rotating magnetic field and a magnetizable cup shaped rotor having a serrated edge fastened on a shaft rotatably and slidably mounted in said magnetic field.

3. In a self starting synchronous motor, means for producing a rotating magnetic field and a cup shaped rotor having a serrated edge fastened on a shaft rotatably mounted in said magnetic field, said cup shaped rotor being formed of magnetizable material, the shell portion having a large amount of remanence and each unit of said serrated edge lying substantially in the surface of a truncated cone.

4. In a self starting synchronous motor, means for producing a rotating magnetic field and a cup shaped rotor having a serrated edge fastened on a shaft rotatably mounted in said magnetic field, said cup shaped rotor being formed of magnetizable material, the bottom and the shell portions having a large amount of remanence and each unit of said serrated edge lying substantially in the surface of a truncated cone.

5. In a self starting synchronous motor, means for producing a rotating magnetic field and a cup shaped rotor having a serrated edge fastened on a shaft rotatably mounted in said magnetic field, said cup shaped rotor being formed of magnetizable material, the shell portion having a large amount of remanence in combination with a movable member of magnetic material mounted independently of said rotor in said field adjacent to said rotor to co-act with the serrated edge of said rotor to bring said rotor to synchronous speed.

6. In a self starting synchronous motor, means for producing a rotating magnetic field and a cup shaped rotor having a serrated edge fastened on a shaft rotatably mounted in said magnetic field, said cup shaped rotor being formed of magnetizable material, the bottom and the shell portions having a large amount of remanence, in combination with a movable member of magnetic material mounted independently of said rotor in said magnetic field adjacent to said rotor to co-act with the serrated edge of said rotor to bring said rotor to synchronous speed.

7. In a self starting synchronous motor, means for producing a rotating magnetic field and a cup shaped rotor having a serrated edge fastened on a shaft rotatably mounted in said magnetic field, said cup shaped rotor being formed of magnetizable material, the shell portion having a large amount of remanence, and the serrated edge having only a small amount of remanence, in combination with a movable member of magnetic material mounted independently of said rotor in said field adjacent to said rotor to co-act with the serrated edge of said rotor to bring said rotor to synchronous speed.

8. In a self starting synchronous motor, means for producing a rotating magnetic field and a cup shaped rotor having a serrated edge fastened on a shaft rotatably mounted in said magnetic field, said cup shaped rotor being formed of magnetizable material, the bottom and the side portions of same having a large amount of remanence and the serrated edge having a small amount of remanence, in combination with a movable member of magnetic material mounted independently of said rotor in said magnetic field adjacent to said rotor to co-act with the serrated edge of said rotor to bring said rotor to synchronous speed.

9. In a self starting synchronous motor, means for producing a rotating magnetic field, a shaft rotatably and slidably mounted in said field, a cup shaped rotor of magnetizable material having a plurality of slots formed in its edge mounted on said shaft, a synchronizing member movably mounted adjacent to said magnetic field, and means on said shaft associated with said field and said member whereby said member is brought into co-operative speed controlling relation with said rotor.

10. In a self starting synchronous motor, means for producing a rotating magnetic field, a shaft rotatably and slidably mounted in said field, a cup shaped rotor of magnetizable material having a plurality of slots formed in its edge mounted on said shaft, a synchronizing member movably mounted adjacent to said magnetic field, and means on said shaft and said member comprising a lost motion connection associated with the attraction of said field on said rotor whereby said member is brought into co-operative speed controlling relation with said rotor.

11. In a self starting synchronous motor, means for producing a rotating magnetic field, a shaft rotatably and slidably mounted in said field, a cup shaped rotor of magnetizable material having a plurality of slots formed in its edge mounted on said shaft, a synchronizing member movably mounted adjacent to said magnetic field, and means on said shaft associated with said field whereby said member is brought into co-operative speed controlling relation with said rotor with resilient means for retaining said member in said relation.

12. In a self starting synchronous motor, means for producing a rotating magnetic field, a shaft rotatably mounted in said field, a cup shaped rotor having a uniformly serrated edge mounted on said shaft the cup shaped portion of which has a large amount of remanence and the serrated edge a smaller amount of remanence, a synchronizing member movably mounted adjacent to said magnetic field external to said rotor and means associated with said shaft and said field to bring said member into co-operative speed controlling relation with the serrated edge of said rotor.

13. In a self starting synchronous motor, means for producing a rotating magnetic field, a shaft rotatably and slidably mounted in said field, a cup shaped rotor having a uniformly serrated edge mounted on said shaft the cup shaped portion of which has a large amount of remanence and the serrated edge a smaller amount of remanence, a synchronizing member movably mounted adjacent to said magnetic field external to said rotor and means associated with said shaft said member and said field to bring said member into co-operative speed controlling relation with the serrated edge of said rotor, said means comprising a lost motion connection between said shaft and said member and the magnetic attraction of said field.

14. In a self starting synchronous motor, means for producing a rotating magnetic field, a shaft rotatably and slidably mounted in said field, resilient means associated with said shaft, a cup shaped rotor having a uniformly serrated edge mounted on said shaft the cup shaped portion of which has a large amount of remanence and the serrated edge a smaller amount of remanence, a synchronizing member movably mounted adjacent to said magnetic field external to said rotor and means associated with said shaft and said member to bring said member into co-operative speed controlling relation with the serrated edge of said rotor.

15. In a self starting synchronous motor, means for producing a rotating magnetic field, a shaft rotatably and slidably mounted in said field, resilient means associated with said shaft, a cup shaped rotor having a uniformly serrated edge mounted on said shaft the cup shaped portion of which has a large amount of remanence and the serrated edge a smaller amount of remanence, a synchronizing member movably mounted adjacent to said magnetic field external to said rotor and means associated with said shaft and said member to bring said member into co-operative speed controlling relation with the serrated edge of said rotor, said means comprising a lost motion connection between said shaft and said member.

16. In a self starting synchronous motor, means for producing a rotating magnetic field, a shaft rotatably and slidably mounted in said field, resilient means associated with said shaft, a cup shaped rotor having a uniformly serrated edge mounted on said shaft the cup shaped portion of which has a large amount of remanence and the serrated edge a smaller amount of remanence, a synchronizing member movably mounted adjacent to said magnetic field external to said rotor and means associated with said shaft, said member and said field to bring said member into co-operative speed controlling relation with the serrated edge of said rotor, with resilient means for retaining said member in said relation.

17. In a self-starting synchronous motor, means for producing a rotating magnetic field, a shaft rotatably mounted in said magnetic field, a cup shaped rotor having a serrated edge and composed of magnetizable material, the bottom and side portions of same having a substantial amount of remanence, and the serrated edge having a smaller amount of remanence, mounted on said shaft, in combination with a movable member of magnetic material mounted independently of said rotor in said magnetic field adjacent to the serrated edge of said rotor with means associated with said shaft for positioning said movable member to cause said rotor to run at synchronous speed.

18. In a synchronous motor, means for producing an alternating magnetic field and a cup shaped rotor formed of magnetizable material having a serrated edge fastened on a shaft rotatably mounted in said magnetic field each unit of said serrated edge lying substantially in the surface of a truncated cone.

19. In combination, means for producing a rotating magnetic field, movably mounted salient poles positioned to coact with said magnetic field, a cup shaped rotor of magnetic material rotatably mounted in said magnetic field and a plurality of serrated projections on said rotor coacting with said salient poles whereby said rotor will run at synchronous speed.

20. In combination, means for producing a rotating magnetic field, a rotor having induction motor starting means and salient poles mounted in said field, a member of magnetic material adjacent to said field movably mounted independently of said rotor and means for bringing said member in co-operative relation with the salient poles on said rotor and said field whereby said rotor will rotate at a synchronous speed.

21. In a self-starting synchronous motor, means for producing a rotating magnetic field, a rotor of magnetic material having self-starting means and salient poles co-acting with said field, a magnetized element movably mounted independent of said rotor adjacent to said field and said rotor co-acting with the salient poles on said rotor whereby said rotor will operate at synchronous speed.

22. In a self-starting synchronous motor, means for producing a rotating magnetic field, a rotor having self-starting means coacting with said field, a plurality of salient poles on said rotor, a member of magnetic material adjacent to said field movably mounted independently of said rotor and means for bringing said member to cooperate with said salient poles on said rotor whereby said rotor will run at synchronous speed.

ANDREW H. NEUREUTHER.